Patented June 5, 1951

2,555,955

UNITED STATES PATENT OFFICE 2,555,955

PHENYL AMINO BENZOYL ALKANOIC ACIDS

Robert R. Burtner, Skokie, Ill., and Harry A. Arbit, Los Angeles, Calif., assignors to G. D. Searle & Co., Skokie, Ill., a corporation of Illinois No Drawing. Application March 25, 1948, Serial No. 17,104

6 Claims. (Cl. 260—518)

This invention relates to phenylaminobenzoylalkanoic acids, as well as to methods for preparing such acids. In particular it relates to compounds having the general formula

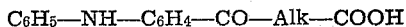

$C_6H_5—NH—C_6H_4—CO—Alk—COOH$ wherein Alk represents an alkylene radical.

The compounds of the foregoing formula are useful substances for the preparation of surface-active agents and as intermediates in the preparation of dyes and pharmaceuticals. They are furthermore useful as insecticides, antioxidants, and pharmaceuticals. It is the object of this invention to provide efficient methods for preparing such compositions of matter, and to provide such compositions.

In the foregoing general formula, Alk represents a bivalent saturated aliphatic radical containing 2 to 8 carbon atoms. Such a radical is derived from a saturated aliphatic hydrocarbon which may have a straight or a branched chain. Among the alkylene radicals which are represented by Alk are ethylene, propylene, butylene, trimethylene, tetramethylene, amylene, and polymethylene radicals up to and including octamethylene. Representative of the compounds which comprise this invention are the following:

A. β-(p-Anilinobenzoyl)propionic acid, having the formula

B. α-Methyl-β-(p-anilinobenzoyl)propionic acid, of the formula

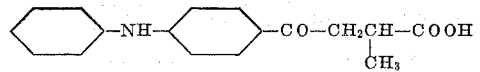

C. γ-(p-Anilinobenzoyl)butyric acid, of the formula

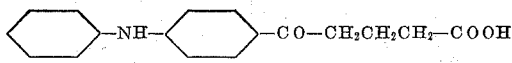

D. δ-(p-Anilinobenzoyl)valeric acid, of the formula

E. α-Methyl-β-(p - anilinobenzoyl)butyric acid, which has the formula

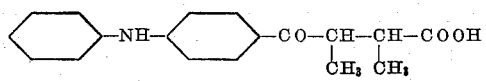

F. β-(o-Anilinobenzoyl)propionic acid, of the formula

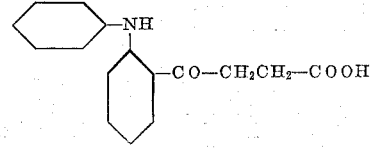

G. ω-(p-Anilinobenzoyl)pelargonic acid, having the formula

The compounds of this invention can be produced by reacting an N-acyl diphenylamine with a carboalkoxyalkanoylhalide in the presence of a Friedel-Crafts catalyst such as anhydrous aluminum chloride, anhydrous ferric chloride, stannic chloride, boron trifluoride, hydrogen fluoride, anhydrous zinc chloride, and related compounds. Solvents for these reactions should be selected from substances having lower reactivity than acetylated diphenylamines. Among such substances are nitrobenzene, carbon disulfide, tetrachloroethane, chlorobenzene, and similar solvents. After the condensation the product is hydrolyzed, preferably with alkali, and the desired keto acid is obtained by acidification of the alkaline solution. In certain instances, it is also possible to prepare the compounds to which this invention relates by condensing an N-acyl diphenylamine with an anhydride of a dibasic acid containing 4 to 10 carbon atoms. Among such acid anhydrides are those derived from succinic, glutaric, adipic, pimelic, subaric, azelaic, sebacic, as well as alkylated derivatives of dibasic acids such as pyrotartaric, ethylsuccinic, α-methylglutaric, β-methylglutaric, α-methyladipic, and related acids.

Salts of the keto acids to which this invention relates may be obtained by neutralization of the acids with organic or inorganic bases such as sodium carbonate, sodium hydroxide, potassium bicarbonate, calcium hydroxide, ammonium hydroxide and ammonium carbonate; methylamine, dimethylamine, ethylamine, and related mono-, di- and tri- alkylamines; alkanolamines such as ethanolamine, isopropanolamine, triethanolamine, diethylaminoethanol; and strong heterocyclic amines which are aliphatic in character, including morpholine, piperidine, and related substances.

Alkaline salts of these acids may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of alkali. The salts are often insoluble in alcohol and may be obtained as precipitates. In other cases another solvent such as ether or benzene may be added to throw down the salt. Salts of aliphatic amines may be obtained by treating a solution of the acid in an organic solvent with a solution of the amine in a similar solvent and precipitating the desired salt with another miscible solvent in which the salt is insoluble.

Our invention is further disclosed by means of the following examples, which are set forth for the purpose of illustration and which in no way are to be construed as limiting our invention in spirit or in scope. It will be apparent to those skilled in the art that innumerable conventional modifications in solvent, temperature, catalyst and reagents can be adopted without departure from the intent and purpose of this invention. Quantities of materials are given in parts by weight unless otherwise noted.

*Example 1*

A solution of 76 parts of diphenylamine and 46 parts of acetic anhydride in 300 parts of xylene is refluxed for 3 hours and then evaporated to about ¼ its volume under reduced pressure. Upon chilling, crystals of N-acetyl diphenylamine separate. These are collected on a filter, washed with petroleum ether, and recrystallized from petroleum ether. N-acetyldiphenylamine forms small, glistening white crystals melting at 101-102° centigrade.

To an agitated refluxing solution of 53 parts of N-acetyldiphenylamine and 38 parts of β-carbomethoxypropionyl chloride in 2300 parts of dry carbon disulfide are added, in small portions, 110 parts of anhydrous aluminum chloride. After the addition of aluminum chloride, the mixture is agitated and refluxed for 6 hours, and then allowed to stand for about 15 hours. About 80% of the carbon disulfide is removed by distillation, and the viscous residue is quenched in an excess of ice and hydrochloric acid. The resulting mixture is extracted 3 times with chloroform and the combined chloroform solutions are extracted with 5% hydrochloric acid. The chloroform is then removed under vacuum, and the viscous residue is refluxed for 2 hours with 250 parts of 8% sodium hydroxide solution. The alkaline extract is heated with decolorizing charcoal and filtered. The chilled filtrate deposits a small quantity of diphenylamine, which is removed by filtration. The alkaline filtrate is added slowly to an excess of 10% hydrochloric acid. The dark precipitate of β-(p-anilinobenzoyl)propionic acid granulates upon standing, and is collected on a filter, washed and dried. Treatment with boiling methyl ethyl ketone removes most of the dark-colored impurities. The yellow crystals of β-(p-anilinobenzoyl)propionic acid (compound A) which are obtained from this treatment melt at 201-203° C.

Further purification affords light yellow-green fluffy crystals melting at 203-204° C. Recrystallization from methyl ethyl ketone does not change this melting point.

By the use of α-methyl-β-carbomethoxybutyryl chloride (obtained by the reaction of monomethyl α,β-dimethylsuccinate and thionyl chloride) in the foregoing process, there is produced α-methyl-β-(p-anilinobenzoyl)butyric acid (compound E).

*Example 2*

By the condensation of 164 parts of γ-carbomethoxybutyryl chloride with 212 parts of N-acetyldiphenylamine in the presence of 440 parts of anhydrous aluminum chloride in dry carbon disulfide according to the foregoing procedure, followed by hydrolysis of the organic residue in dilute caustic soda solution and subsequent acidification, there is obtained γ-(p-anilinobenzoyl)-butyric acid (compound C). The γ-carbomethoxybutyryl chloride is prepared from methyl hydrogen glutarate and thionyl chloride or phosphorus pentachloride.

By a similar process using δ-carbomethoxyvaleryl chloride (obtained from mono-methyl adipate and thionyl chloride) and N-acetyldiphenylamine, one obtains δ-(p-anilinobenzoyl)-valeric acid (compound D).

We claim:

1. A member of the group consisting of an anilinobenzoylalkanoic acid, wherein the benzene rings are devoid of other substituents and wherein the alkanoic acid radical contains three to nine carbon atoms, and alkali metal salts thereof.

2. A p-anilinobenzoylalkanoic acid of the formula

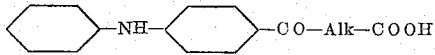

wherein Alk is an alkylene radical containing two to eight carbon atoms.

3. An ω-(anilinobenzoyl)alkanoic acid, wherein the benzene rings are devoid of other substituents and wherein the alkanoic acid radical contains three to nine carbon atoms.

4. A β-(anilinobenzoyl)alkanoic acid, wherein the benzene rings are devoid of other substituents and wherein the alkanoic acid radical contains three to nine carbon atoms.

5. β-(Anilinobenzoyl)propionic acid.

6. β-(p-Anilinobenzoyl)propionic acid.

ROBERT R. BURTNER.
HARRY A. ARBIT.

REFERENCES CITED

The following references are of record in the file of this patent:

UNITED STATES PATENTS

| Number | Name | Date |
|---|---|---|
| 676,860 | Ach | June 25, 1901 |

OTHER REFERENCES

English et al., J. Am. Chem. Soc., vol. 67, pp. 2263-2265 (1945).